United States Patent [19]
Beriger

[11] 3,755,313
[45] Aug. 28, 1973

[54] PESTICIDAL DERIVATIVES OF O,O-DIALKYL-S-THIOMORPHOLINOCARBONYLMENTHYL-THIOPHOSPHATES AND DITHIOPHOSPHATES

[75] Inventor: Ernst Beriger, Neuallschwil, Switzerland

[73] Assignee: Ciba-Geigy A.G., Basel, Switzerland

[22] Filed: Jan. 17, 1972

[21] Appl. No.: 218,552

[30] Foreign Application Priority Data
Apr. 16, 1968 Switzerland.......................... 5552/68

Related U.S. Application Data

[62] Division of Ser. No. 815,522, April 8, 1969, Pat. No. 3,658,800.

[52] U.S. Cl............................................. 260/243 B
[51] Int. Cl............................................. C07d 93/10
[58] Field of Search ................................ 260/243 B

[56] References Cited
UNITED STATES PATENTS
3,658,800  4/1972  Beriger........................... 260/243 B

*Primary Examiner* — Richard J. Gallagher
*Attorney* — Harry Goldsmith et al.

[57] ABSTRACT

Phosphates and Thiophosphates containing a special morpholino or isomorpholino residue and having insecticidal, acaricidal and herbicidal properties are disclosed.

3 Claims, No Drawings

PESTICIDAL DERIVATIVES OF O,O-DIALKYL-S-THIOMORPHOLINOCARBONYLMENTHYL-THIOPHOSPHATES AND DITHIOPHOSPHATES

This is a division of application Ser. No. 815,522, filed on Apr. 8, 1969, now U.S. Pat. No. 3,658,800.

The present invention relates to pesticidal preparations for destroying insects, nematodes and arachnoids (mites, spider mites and ticks) and for controlling grassy weeds and other weeds in important plant cultures, among them also cultures of monocotyledonous plants, in the preemergent and the post-emergent treatment. The new preparations contain, in addition to an active ingredient, one or more of the following additives: a vehicle, a solvent, a diluent, a dispersant, an emulsifier, a thickener, an adhesive, a wetting agent and/or a fertilizer and/or further pesticides.

The active ingredients concerned are compounds of the general formula

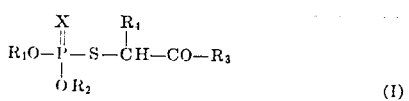

in which $R_1$ and $R_2$ each represents an alkyl group having one to four carbon atoms, X represents an oxygen or sulphur atom, $R_3$ represents one of the following 6-membered heterocycles containing 2 hereto atoms:

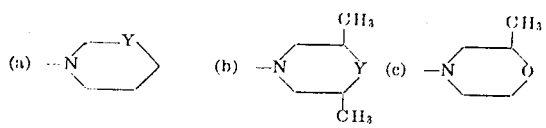

(in which Y represents an oxygen or sulphur atom) and $R_4$ represents hydrogen or a methyl group.

Some of the active substances are new, and the invention includes these as well.

O,O-dimethyl-S-morpholino-carbamoylmethyl-dithiophosphate is, for example, a known compound which was observed to have a good insecticidal activity. However, surprisingly the new compounds have a broader activity spectrum against animal pests, especially insofar as their systemic activity is concerned. The amount in which they have to be applied for use as insecticides on plants is small; only when greater amounts, such as about 2 kg per hectare, are applied, can the selective herbicidal activity be clearly seen, especially in the case of those compounds in which $R_3$ represents the iso(thio)morpholine residue (a).

On the other hand, the insecticidal, acaricidal and nematocidal activity is equally good with all compounds of the formula I, independently of the meaning of the substituent $R_3$ and of whether X represents oxygen or sulphur.

The toxicity towards warm-blooded animals of the compounds is satisfactorily low; thus, the compound No. 11 referred to below has an oral toxicity towards the rat of $LD_{50} = 110$ mg per kg bodyweight.

Among animal pests of the classes Hexapoda and Arachnoidea, there may be mentioned, for instance, the following orders and suborders: Musca, Aphis, Orgyia, Prodenia, Epilachna, Locusta, Rhipicephalus, Dermanyssus, Tetranychus, Aedes, blowfly and all development stages of insects that attack stores, including egg clusters. This enumeration is not complete, but merely emphasizes the most important types of harmful insects and Arachnoidea.

The compounds of the formula I can be manufactured by reacting an α-halocarboxylic acid halide or ester in either order with a 1,3- or 1,4-oxazan or 1,3- or 1,4-thiazan and with a dialkyl thiophosphate or dithiophosphate.

In pesticidal preparations and for handling in practice, the new compounds may be in the form of granulates, dusting agents, emulsion concentrates, dispersions or sprays, as for instance for the gas phase application in greenhouses, or as solutions or suspensions in the usual formulation, as described in U.S. Specification 3,329,702, British Specification 1,047,644 or Swiss Specification 424,359, some examples of which are given below. When using the preparation against animal pests, the use of baits is likewise possible.

The following Examples illustrate the invention, the parts being by weight.

EXAMPLE 1

38.3 Parts of N-chloroacetyl-2,6-dimethyl-1,4-oxazan (b.p. 108°C under 0.08 mm Hg; prepared in the usual manner by reaction of chloroacetylchloride with 2,6-dimethyl-1,4-oxazan) were stirred with 39 parts of potassium-dimethyl-dithiophosphate in 260 parts by volume of acetone overnight at room temperature. The reaction mixture was worked up by suctioning off the salts, evaporating the acetone under vacuum and taking up the residue in methylenechloride. The methylenechloride solution was washed with water and then with sodium hydrogencarbonate solution and the solvent was expelled under vacuum at 50°C, to leave, as residue, 51 parts of the compound of the formula

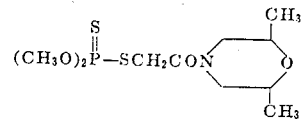

in the form of a faintly yellowish oil [Compound No. 1]

$n_D^{24}$ 1,5424

The following thiolophophates and dithiophosphates of the formula

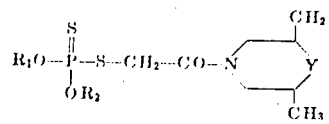

where manufactured in a similar manner:

| Compound No. | $R_1$ | $R_2$ | Y | Physical constants |
|---|---|---|---|---|
| 2 | $C_2H_5$- | $C_2H_5$- | O | $n_D^{21}$ 1.5268 |
| 3 | n-$C_4H_9$- | n-$C_4H_9$- | O | |
| 4 | $CH_3$- | $CH_3$- | S | b.p. 110° 0.005 |
| 5 | $C_2H_5$- | $C_2H_5$- | S | $n_D^{21}$ 1.5490 |

The following thiolophosphates and dithiophosphates of the formula

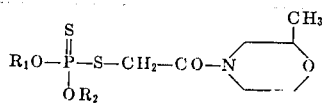

were manufactured in a similar manner:

| Compound No. | R₁ | R₂ | Physical constants |
|---|---|---|---|
| 6 | $CH_3-$ | $CH_3-$ | $n_D^{20}$ 1.5482 |
| 7 | $C_2H_5-$ | $C_2H_5-$ | $n_D^{20}$ 1.5332 |
| 8 | iso-$C_3H_7-$ | iso-$C_3H_7-$ | $n_D^{20}$ 1.5207 |
| 9 | $CH_3-$ | $C_2H_5-$ | |
| 10 | $CH_3-$ | iso-$C_3H_7-$ | $n_D^{20}$ 1.5310 |

The following thiolophosphates and dithiophosphates of the formula

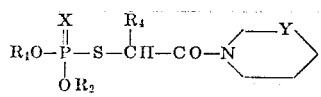

were manufactured in a similar manner:

| Compound No. | R₁ | R₂ | X | Y | R₄ | Physical constants |
|---|---|---|---|---|---|---|
| 11 | $CH_3-$ | $CH_3-$ | S | O | H | B.P.₀.₂ 100° |
| 12 | $C_2H_5-$ | $C_2H_5-$ | S | O | H | $n_D^{21}$ 1.5380 |
| 13 | n-$C_3H_7-$ | n-$C_3H_7-$ | S | O | H | $n_D^{24}$ 1.5290 |
| 14 | $CH_3-$ | iso-$C_3H_7-$ | S | O | H | $n_D^{24}$ 1.5352 |
| 15 | $C_2H_5-$ | $C_2H_5-$ | O | O | H | $n_D^{20}$ 1.5042 |
| 16 | iso-$C_3H_7-$ | iso-$C_3H_7-$ | S | O | H | $n_D^{24}$ 1.5226 |
| 17 | $CH_3-$ | $CH_3-$ | S | S | H | |
| 18 | $C_2H_5-$ | $C_2H_5-$ | S | S | H | |
| 19 | $C_4H_9-$ | $C_4H_9-$ | S | O | H | $n_D^{24}$ 1.5205 |
| 20 | $CH_3-$ | $CH_3-$ | S | O | $CH_3$ | $n_D^{24}$ 1.5570 |
| 21 | $C_2H_5-$ | $C_2H_5-$ | S | O | $CH_3$ | $n_D^{24}$ 1.5380 |
| 22 | iso-$C_3H_7-$ | iso-$C_3H_7-$ | S | O | $CH_3$ | $n_D^{24}$ 1.5293 |

EXAMPLES OF FORMULATION

Dusting Agent

Equal parts of an active substance of this invention and of precipitated silicic acid were finely ground together. By mixing this powder with kaolin or talcum, a dusting agent preferably containing 1 to 6 percent of active substance can be manufactured.

Spray Powder

In order to manufacture a spray powder, for example, the following ingredients are mixed and finely ground together:

50 parts of active substance of this invention
50 parts of "Hisil" (highly adsorptive silicic acid)
25 parts of bolus alba (kaolin)
3.5 parts of an adduct of p-tertiary octylphenol with ethylene oxide
1.5 parts of sodium 1-benzyl-2-stearylbenzimidazole-6,3'-disulphonate.

Emulsion Concentrate

Readily soluble active substances can also be formulated as emulsion concentrates in the following manner:

20 parts of active substance
70 parts of xylene and
10 parts of a mixture of calcium dodecylbenzenesulphonate and an adduct of an alkyl-phenol with ethylene oxide are mixed. When this mixture is diluted with water to the desired concentration, an emulsion ready for spraying is obtained.

EXAMPLE 2 a. Activity Against Ticks (Rhipicephalus Bursa)

Testing method: 10 Ticks are dipped for 1 minute in a glass tube containing the emulsified active substance in different concentrations, then the liquid is sucked off and the residue kept for a fortnight. A 100 percent lethal effect was recorded with the following concentrations:

| Compound No. | Concentration in ppm |
|---|---|
| 1 | 100 |
| 2 | 10 |
| 4 | 100 |
| 5 | 10 |
| 11 | 50 |
| 12 | 100 | b. Activity Against Mites (Dermanyssus Gallinae)

Ten to 20 mites per tube were tested as described for the tick test. The value of the concentration of the active substance in the following table represents the minimum content for a 100 percent lethal effect against the mites tested after 3 days:

| Compound No. | Concentration in ppm |
|---|---|
| 2 | 100 |
| 4 | 100 |
| 5 | 10 |
| 11 | 10 |

EXAMPLE 3

Activity Against Lucilia Sericata (Larvae)

A dilution series was prepared with the emulsifiable preparation of an active substance of the formula I. 2 ml of one concentration were mixed in a glass vessel of 10 ml capacity with 2 g of chopped horse meat, and 20 to 30 freshly hatched larvae were introduced into this vessel. Evaluation was carried out 24 hours later. The indicated concentration in ppm produces a 100 percent lethal effect within 24 hours:

| Compound No. | Concentration in ppm |
|---|---|
| 2 | 24 |
| 5 | 50 |
| 11 | 12 |

EXAMPLE 4

1. Contact Effect Against Musca Domestica (L.)

One half each of a Petri dish was teated with 1 ml each of an an acetonic solution of compound No. 12, containing 200 and 100 ppm respectively of the active substance. The solvent was then evaporated and deep-cooled houseflies introduced into the prepared Petri dishes and the lids were put on. Each dish contained 10 test flies. After increasing intervals of time, the lethal effect for each concentration was checked. Both concentrations displayed a 100 percent lethal effect after 8 hours.

2. Stomach Poison Effect Against Musca Domestica (L.)

In order to test the effect of the preparations as stomach poisons against houseflies, specimens of a saturated sugar solution with the emulsified active substance No. 12 were prepared so that two concentrations of 3333 ppm and 1111 ppm were obtained. The two concentrations in sugar solution were then applied in an amount of 3 drops each by mean of a glass rod to the inside of the lid of the Petri dish. 10 Freshly hatched, unfed flies each were deep-cooled and introduced into the bottom half of a dish. The lid, treated with the preparation to be tested, was then put on. After 4 hours, a 100 percent lethal effect via the intestinal tract was achieved with both concentrations.

EXAMPLE 5

1. Tests with Larvae of Orgyia Gonostigma and Epilachna Varivestis

Young Phaseolus plants are immersed in aqueous solutions containing 800 ppm of active substance, allowed to dry and then infested with 5 larvae of Epilachna varivestis in the L-4 stage, whereupon the whole plant is covered with a plastic bag. The same kind of test is carried out with 5 larvae each of Orgyia gonostigma in the L-3 stage and with young mallow plants. The following results were obtained:

| Compound No. | Larvae after | | Lethal effect |
|---|---|---|---|
| | Lethal effect at a concentration of 0.08 percent of active substance | | |
| 12 | Orgyia | 5 days | 100 % |
| 2 | Epilachna | 5 days *) | 100 % |

*) after 2 days removed from the aged layer.

EXAMPLE 6

Activity Against Aphis Fabae

A. The aphicidal effect of the preparation was tested against Aphis fabae (S.) on the test plant Vicia faba, with the use of aqueous emulsions of the active compound No. 11 in concentration series of 800 to 100 ppm in various ways.

In the contact test, the solution was sprayed all over the infested plant using an atomizer of the type used in chromatography. This test was evaluated 2 days later by counting the killed and the surviving aphids under a handheld magnifying lens. All animals were then removed, and the plants reinfested with a new population. 5 Days after spraying another evaulation was carried out.

B. In order to test the penetration effects, plants were used whose leaves were as far as possible at right angles to the shoot, and the aphids were localised mainly on the underside of the leaves. In this case, spraying was not carried out all over, but vertically from above on to the plants. The penetration test was evaluated 2 days later.

The effect against Aphis fabae is summarised in the following Table, in which the lethal effect is shown in percent:

| Compound No. | Concentration [ppm] | Contact 2 Days | Contact 5 Days | Penetration 2 Days |
|---|---|---|---|---|
| 11 | 800 | 100 % | 100 % | 100 % |
| | 400 | 100 % | 80 % | 100 % |
| | 200 | 100 % | 80 % | 100 % |
| | 100 | 100 % | 0 % | 60 % |
| 15 | 800 | 100 % | 100 % | 100 % |
| | 400 | 100 % | 100 % | 100 % |
| | 200 | 100 % | 80 % | 100 % |
| | 100 | 100 % | 0 % | 60 % |

Similar results were obtained with compounds 1 and 5.

EXAMPLE 7 a. Activity Against Red Spider Mites (Tetranychus Urticae)

Dwarf beans in the 2-leaf stage were infested with red spider mites 24 hours before being treated with the active substance, by placing infested pieces of leaves of the grown plants upon the test plants. The treatment of the infested test plants consisted of spraying with the emulsified active substance by means of an atomizer as used in chromatography. 2 Days later, the plants were inspected with binoculars and the number of mites killed was calculated in percent. The effect of compound No. 2 on adults after 7 days in a concentration of 0.08 percent was 100 percent lethal. Similar results were obtained with the other compounds mentioned in Example 1.

EXAMPLE 8

In order to test the effect against various pests attacking stores, 5 g each of one of the compounds of the formula I were mixed with 95 g of talcum and very finely ground. In use, this dusting powder produced the following results:

| Test Species of Pests | Minimum concentration for 100 % death in 24 hours exposure time (mg active material per m³) | | |
|---|---|---|---|
| | Compound No. 2 | 5 | 11 |
| German cockroaches (Phyllodromia germanica) | 100 | 100 | 50 |
| American cockroaches (Periplaneta americana) | 100 | 100 | 200 |
| Russian cockroaches (Blatta orientalis) | 100 | 200 | 200 |
| Flour beetle imago | 100 | 100 | 25 |
| (Tenebrio molitor) Larvae | 200 | — | 100 |

EXAMPLE 9

In the greenhouse test for the selective herbicidal activity in the pre-emergent process, the following plants were sown: Digitaria (crab grass), Panicum (finger grass), Alopecurus (foxtail), Avena (oats), Zea (maize), Beta (sugar beet), Linum (flax), Brassica (cabbage rape), Soja (soybean) and Gossypium (cotton).

One day after seeding, the pots were treated with the substances Nos. 12, 13 and 14 of this invention, the quantity applied being equal to 2.5 kg of active substance per hectare. The mean values from 3 compounds 21 days after treatment were:

| Test plants | Rating | Plant species |
|---|---|---|
| Digitaria | 8 – 9 | unplanted |
| Panicum | 9 | " |
| Alopecurus | 9 | " |
| Avena | 1 – 2 | cultivated |
| Zea | 1 – 2 | " |
| Beta | 1 | " |
| Linum | 1 – 2 | " |
| Brassica | 2 | " |
| Soja | 1 | " |
| Gossypium | 1 | " |

1 = no effect   9 = plants destroyed

The substances of this invention destroy important grass weeds whereas monocotyledonous cultures, for example, maize or oats and also rice as well as numerous dicotyledonous cultures are not attacked by the substances of this invention.

Quite generally, similar results are obtained with the compounds 15 to 22.

I claim:

1. Compounds of the formula $$R_1O-\underset{\underset{OR_2}{|}}{\overset{\overset{X}{\|}}{P}}-S-\underset{\underset{}{|}}{\overset{\overset{R_4}{|}}{C}}H-CO-N\begin{pmatrix}CH_3\\S\\CH_3\end{pmatrix}$$

wherein each of $R_1$ and $R_2$ represents alkyl of from one to four carbon atoms, $R_4$ represents hydrogen or methyl, and X represents oxygen or sulfur.

2. The compound of claim 1 in which each of $R_1$ and $R_2$ is methyl, $R_4$ is hydrogen, and X is sulfur.

3. The compound of claim 1 in which each of $R_1$ and $R_2$ is ethyl, $R_4$ is hydrogen, and X is sulfur.

* * * * *